(12) United States Patent
Day

(10) Patent No.: US 7,650,985 B2
(45) Date of Patent: Jan. 26, 2010

(54) CLOSURE SYSTEM FOR A TROUGH

(75) Inventor: Toby Adam Lennox Day, Joondalup (AU)

(73) Assignee: Sandvik Mining & Construction Australia Pty Ltd, Eagle Farm (AU)

( * ) Notice: Subject to any disclaimer, the term of this patent is extended or adjusted under 35 U.S.C. 154(b) by 298 days.

(21) Appl. No.: 11/594,315

(22) Filed: Nov. 8, 2006

(65) Prior Publication Data

US 2008/0104891 A1     May 8, 2008

(51) Int. Cl.
*B65G 47/04* (2006.01)
(52) U.S. Cl. .......................... 198/532; 49/370
(58) Field of Classification Search .................. 198/532; 49/366, 370
See application file for complete search history.

(56) References Cited

U.S. PATENT DOCUMENTS 2,915,022 A * 12/1959 Dorey ..................... 105/282.1
4,871,059 A * 10/1989 Rantanen et al. ............ 198/532
4,925,356 A *  5/1990 Snead et al. ................. 414/339
6,622,849 B1 *  9/2003 Sperling ..................... 198/533

* cited by examiner

*Primary Examiner*—Mark A Deuble
(74) *Attorney, Agent, or Firm*—Austin Rapp & Hardman

(57) ABSTRACT

A closure system for a trough comprising a first closure member and a second closure member, the first closure member being movable between a closed position, where it closes against the perimeter of a first opening in the bottom of a trough and an open position where it retracts to a position away from contact with the perimeter of the first opening, the second closure member being movable between a closed position where it closes against the perimeter of a second opening in an opposite side of the bottom of the trough and an open position where it retracts to a position away from contact with the perimeter of the second opening, and first and second controllers operable to move the first closure member and second closure member respectively between the open and closed positions.

28 Claims, 5 Drawing Sheets

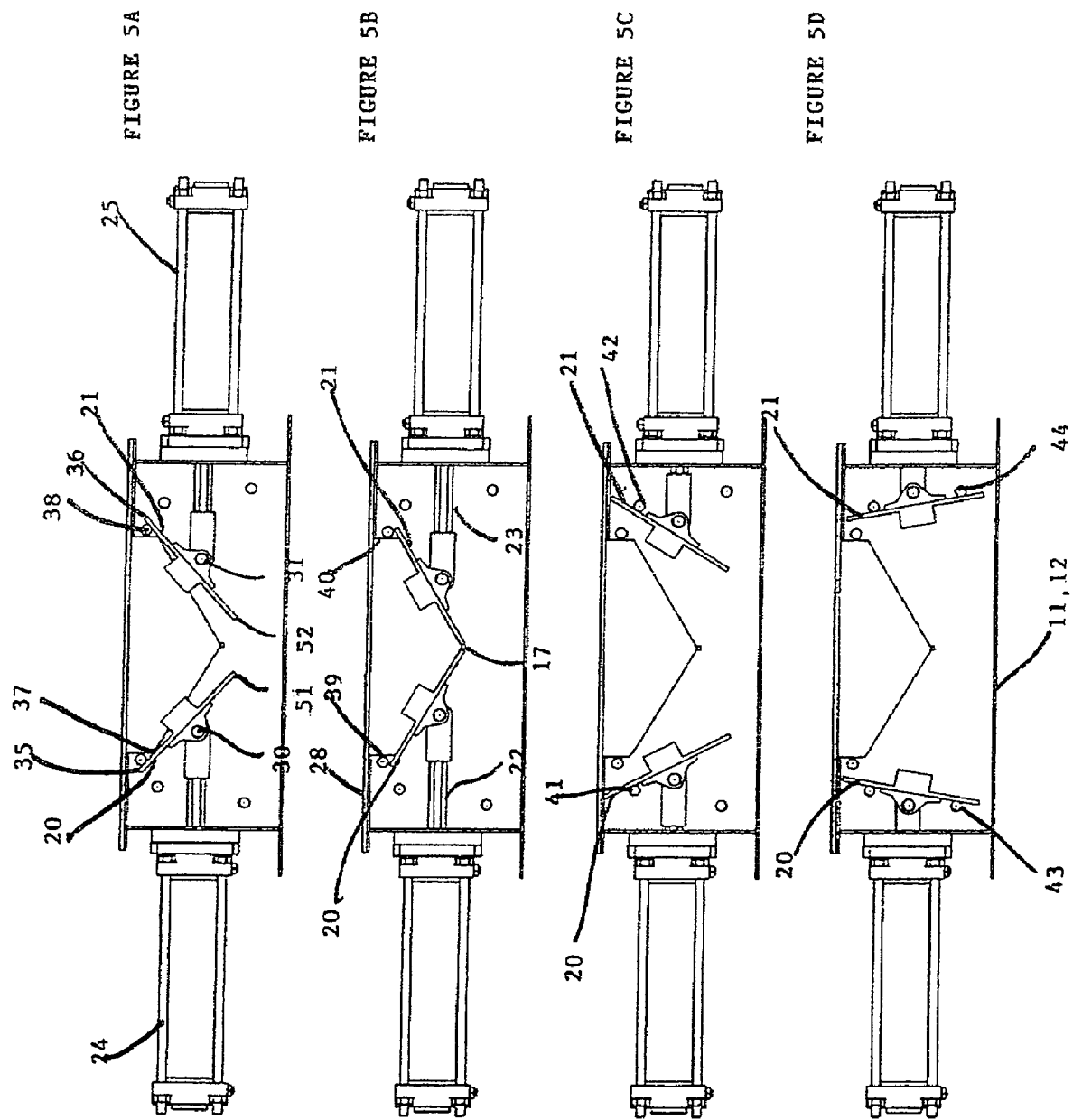

CLOSURE SYSTEM FOR A TROUGH

FIELD OF THE INVENTION

The present invention relates to the mining industry.

BACKGROUND OF THE INVENTION

In drilling operations it is frequently necessary to obtain a sample of drilled material to accurately monitor the material composition. In one type of system a stacked series of drop boxes are employed so that a sufficient amount of material can be collected to enable an adequate flow distribution of the material to be directed to a sampling apparatus. A sample extracted from the sampling apparatus can then give an indication of proportional quantities of minerals within the drilled material.

The existing type of double box system is affected by problems which can result in an inadequate flow distribution of material to the sampler. Such problems may be attributable to faulty operation of trap doors which are controlled to open and close the drop boxes to allow either build up or release of material therein.

One type of trap door design for a drop box consists of a V-shaped trough with rectangular openings which are opened or closed by trap doors which are hinged at their upper ends. Sometimes with this type of arrangement material can build up around the openings and block operation of the trap doors so that they are unable to close properly.

SUMMARY OF THE INVENTION

The present invention provides a closure system for a trough comprising a first closure member and a second closure member, the first closure member being movable between a closed position, where it closes against the perimeter of a first opening in the bottom of a trough and an open position where it retracts to a position away from contact with the perimeter of the first opening, the second closure member being movable between a closed position where it closes against the perimeter of a second opening in an opposite side of the bottom of the trough and an open position where it retracts to a position away from contact with the perimeter of the second opening, and first and second controllers operable to move the first closure member and second closure member respectively between the open and closed positions.

Preferably the trough has a bottom section comprising a lower divider separating the first and second openings.

When the first and second closure members are in the closed position it is preferred that they form a V-shaped bottom section of the trough.

When the first and second closure members are in the closed position it is preferred that they are inclined symmetrically with respect to the divider.

At least one closure member may be retractable to the open position from below the trough.

At least one closure member may be retractable to a position adjacent one side of the trough.

It is preferred that at least one of the closure members is adapted to move laterally between the open and closed positions.

At least one of the closure members may be adapted to move horizontally between the open and closed positions.

It is preferred that the closure members are adapted to move in opposite directions when moving from the open to the closed positions or vice versa.

The first closure member may comprise a flat wall pivotally attached to an arm of the first controller.

It is preferred that the second closure member is similar to the first closure member.

The system may include a first front upper detent and a second front upper detent which respectively provide stops against which the upper edges of the respective closure members abut in the closed position.

Each closure member may be adapted to pivot upwardly with respect to the respective front upper detent when its upper edge strikes the front upper detent.

The lower edge of each closure member may be adapted to abut the divider when in the closed position.

It is preferred that the system includes a first rear upper detent and a second rear upper detent which respectively provide stops against which the upper edges of the closure members abut when moving to the open position.

Each closure member may be adapted to pivot away from the trough with respect to the rear upper detent when retracting to the open position. The system may include first and second lower detents which are respectively adapted to provide stops against which the lower edges of the respective closure members abut in the open position.

Preferably each lower detent is positioned laterally behind the respective rear upper detent.

Each controller may comprise a hydraulic or pneumatic ram.

The arm of the closure member preferably constitutes the ram.

The cross sectional shape of the arm may be hexagonal, rectangular, triangular or another shape other than round.

The system may include a housing component adapted to be connected above a like housing or mixer apparatus.

Preferably the housing component is adapted to be connected below a component for providing a vortex for forcing material through the openings.

The housing components may comprise a box like frame open at the top and bottom.

The housing may include a top and bottom flange for connection to upper and lower components respectively.

It is preferred that the closure members are controlled by the controllers to snap open or closed.

One or more of the detents may be horizontally extending bars.

The system may include two housings each including first and second closure means.

It is preferred that the closure members are able to pivot with respect to the arms.

Preferably the closure members comprise rectangular plates connected to distal ends of arms of the controllers respectively for pivotal movement with respect thereto.

It is preferred that the detents determine the extent to which each closure member is able to pivot.

It is preferred that the trough forms part of the housing of the system.

The trough is preferably located in the centre of the upper flange.

Preferably the upper flange is connected to a receptacle or hopper.

Each of the closure members preferably is provided with locating portions at either ends thereof for locating the closure members against side walls of the trough in the closed position.

Preferably the locating portions comprise metal plate portions.

BRIEF DESCRIPTION OF THE DRAWINGS

A preferred embodiment of the present invention will now be described by way of example only with reference to the accompanying drawings in which:

FIG. 5A shows a schematic front view of the closure system according to the present invention in a partially open mode of operation;

FIG. 5B shows the closure system of FIG. 4A in a closed position;

FIG. 5C shows the closure system in a partially open mode of operation; and

FIG. 5D shows the closure system in a fully open mode of operation.

DETAILED DESCRIPTION OF THE DRAWINGS

Figure 1:
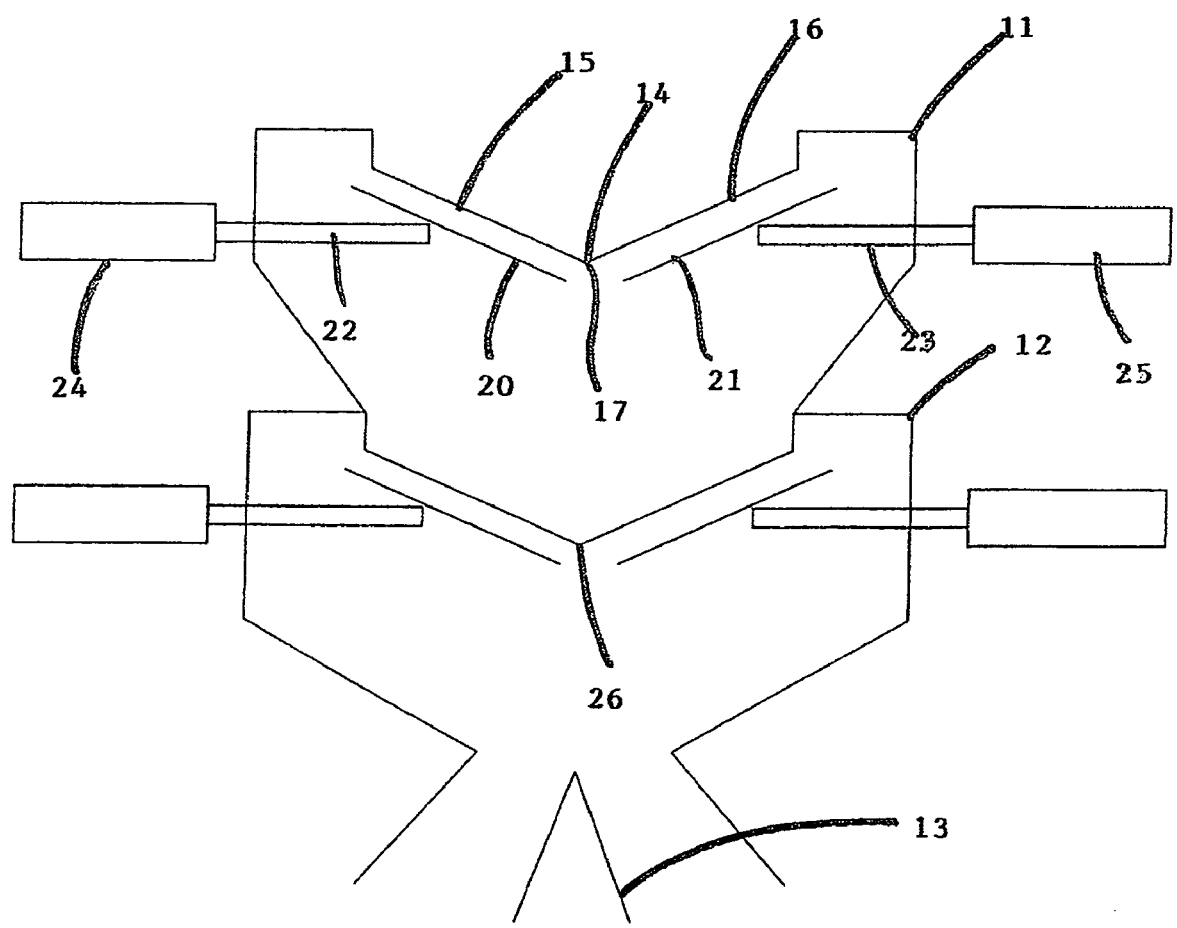
FIG. 1 shows a schematic diagram of a double box arrangement for collecting sampling material in accordance with a preferred embodiment of the present invention.

A double box hopper system is shown in FIG. 1 consisting of an upper box 11 and a lower box 12. A conduit is connected to the upper box 11 and feeds material to the box 12.

Below the box 12 a sample splitter 13 is provided.

The top part of box 11 is provided with a V-shaped trough 14 with rectangular trap door openings 15 and 16 on opposite sides of a divider bar 17 extending horizontally at the lower apex of the trough between end walls of the trough 18, 19.

The openings 15 and 16 which form the floor of the trough 14 are provided with left and right side trap doors 20, 21 which are pivotally connected to the ends of arms 22 and 23 of pneumatic rams 24 and 25 respectively.

Upper box 11 may be integrally formed with trough 26 of lower box 12 or alternatively may be provided with a lower flange plate 27 shown more clearly in FIG. 5A which can be connected to an upper flange plate 28 of lower box 12. The lower box 12 is then connected above the sampler splitter 13 so that the centre-line of the sampler splitter 13 is aligned vertically below the divider of trough 26.

Figure 2:
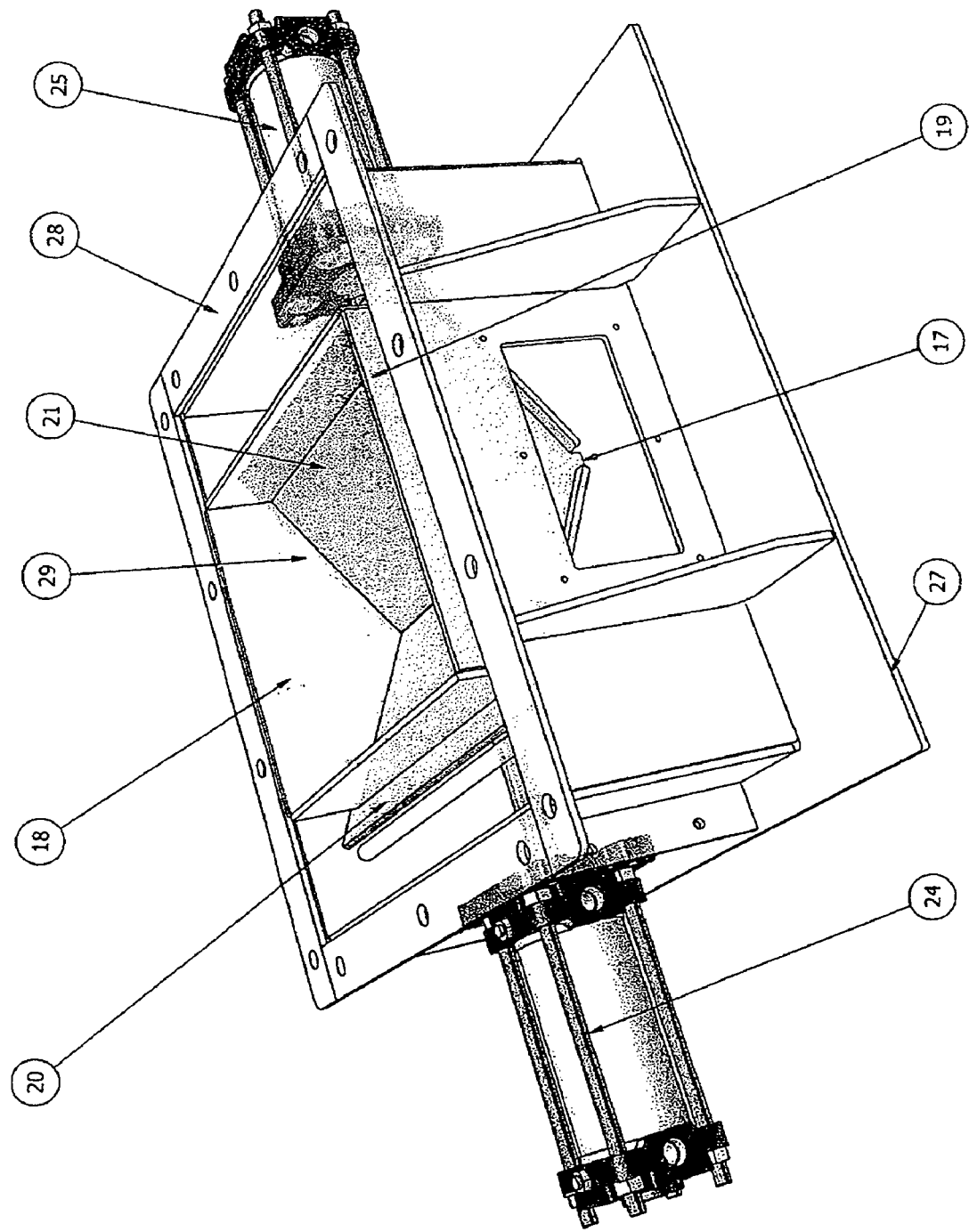
FIG. 2 shows a top angled view of a closure system for a trough according to the preferred embodiment of the present invention.
Figure 3:
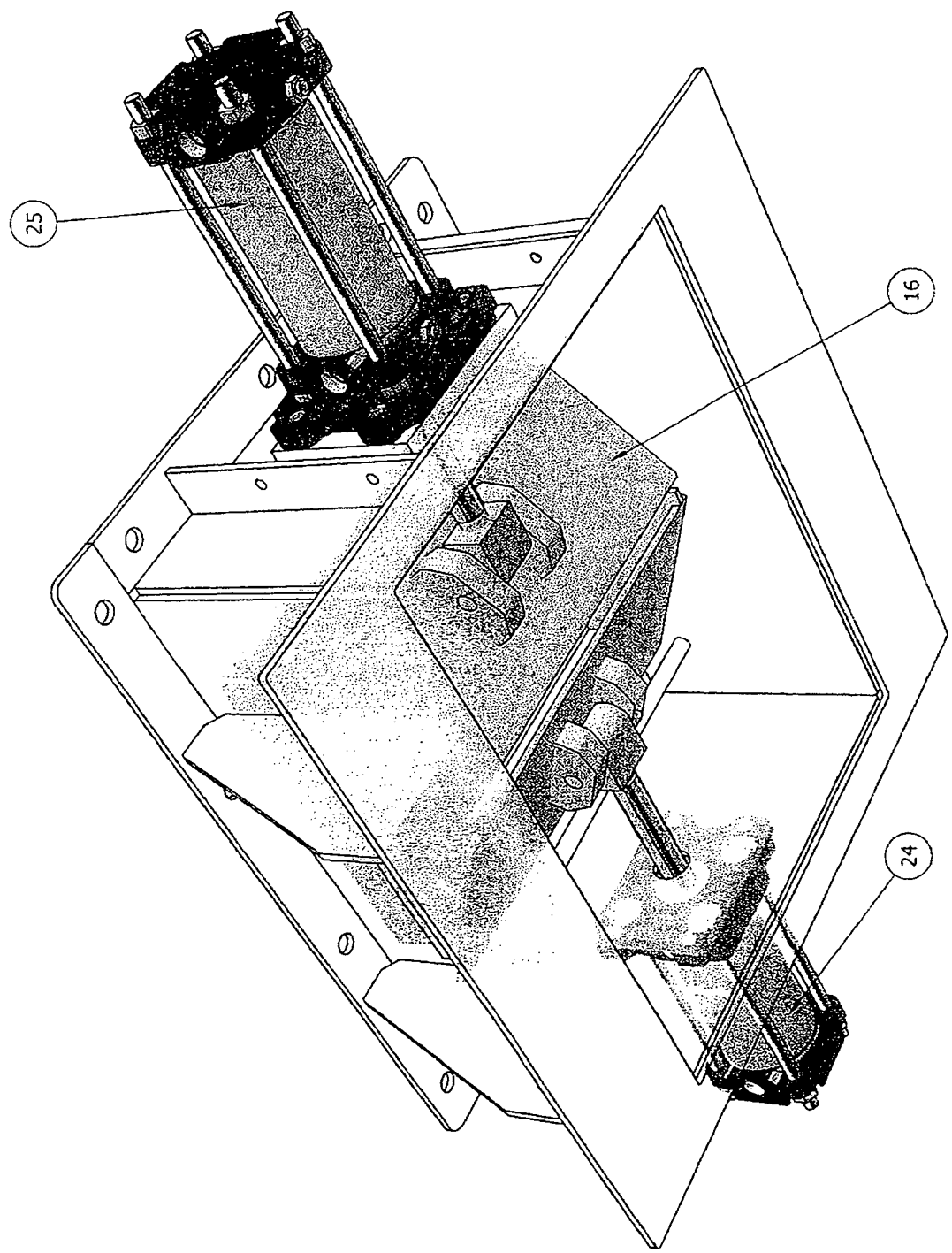
FIG. 3 shows a bottom angled view of the closure system shown in FIG. 2.
Figure 4:
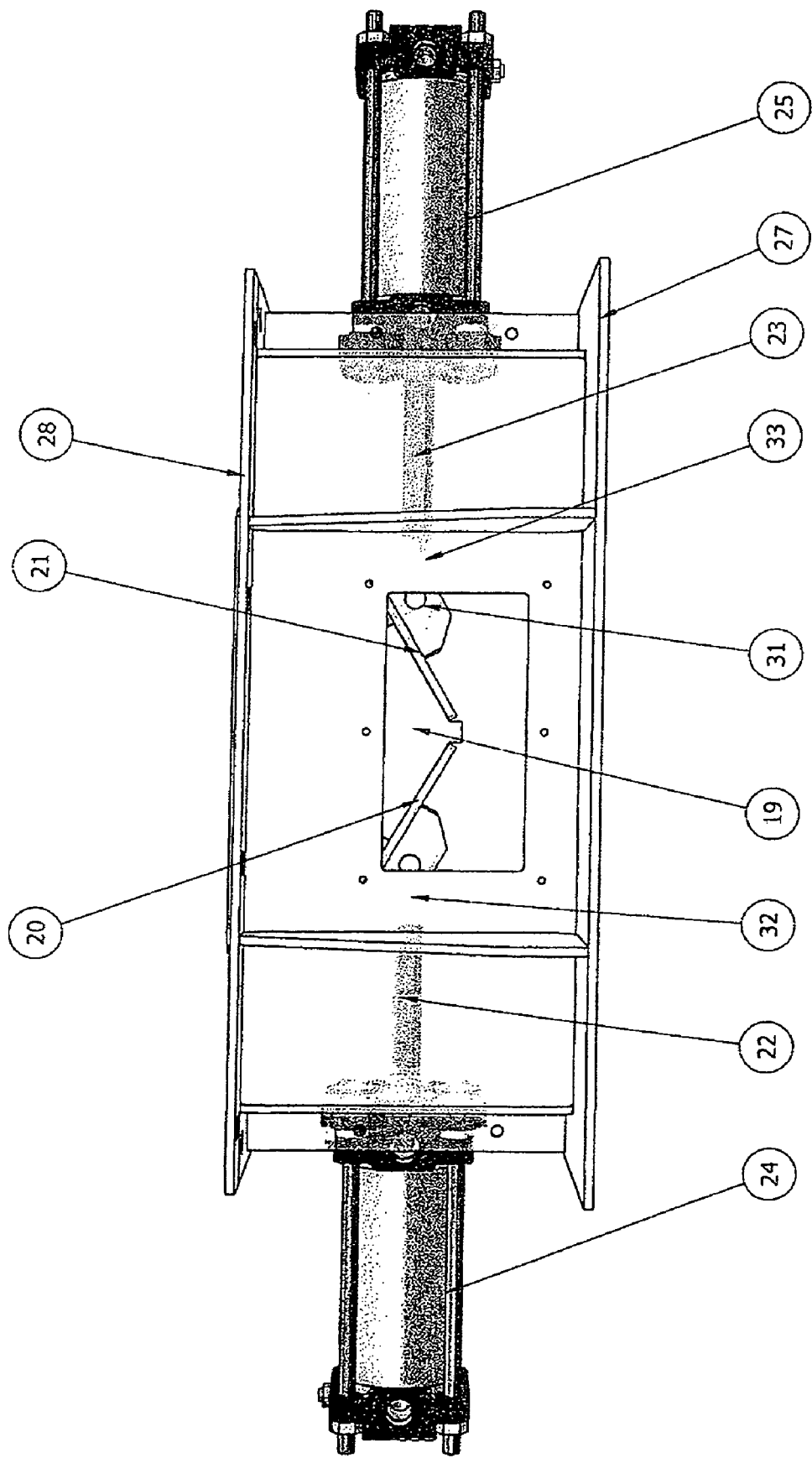
FIG. 4 shows a side view of the closure system shown in FIG. 2.

Referring to FIGS. 2, 3 and 4, each of the trap doors 15 and 16 consists of a rectangular metal plate with end tabs 29, 30 which are configured to slide outside the end walls 18, 19 of the trough 14 when the trap doors are in the closed position.

The upper flange plate 28 effectively covers the perimeter of the trough and enables the box to be connected to a suitable component above. Likewise the lower flange 27 is also a horizontal plate with a hollow central area below the trough 14. This flange 27 in the case of the upper box would be connected to the upper flange 28 of the lower box 12. In the case of the lower box the flange 27 could be dispensed with altogether or could be connected to a suitable connecting element of another component such as that housing the sample splitter 13.

Each of the trap doors 20, 21 is pivotally connected through a pivot pin 30, 31 to an end sleeve attachment 32, 33 on the outer ends of each of the hydraulic ram arms 22, 23 respectively.

Movement of these trapdoors is controlled by a series of horizontal bars as they are moved between open and closed positions by the hydraulic rams 24, 25.

In FIG. 5A each of the hydraulic rams are operated to move their ram arms and hence trap doors 20 and 21 towards the openings in the trough 14. However before they each reach the openings their upper edges 35, 36 strike horizontal bars 37 and 38 respectively located just above the top edge of each opening 15, 16 next to the lower end of vertical walls 39, 40 of the trough 14. The horizontal bars 37, 38 are examples of front upper detents.

Further movement of the arms 22 and 23 horizontally towards the centre of the trough results in pivoting motion of both of the trap doors 20, 21 upwardly with respect to the respective bars 37, 38.

Thus in FIG. 5B the lower edges 51, 52 of the trap doors 20, 21 abut against the edges of the horizontal divider 17.

Furthermore, the other edges of the trap doors abut against adjacent edges around the perimeter of the openings.

In this position the openings are closed by both of the trap doors 20, 21. Further movement of the hydraulic arms 22, 23 is therefore prevented.

If it is desired to retract the trap doors 20, 21 the hydraulic rams 24, 25 are operated to move the arms 22, 23 laterally and horizontally away from the trough 14. As shown in FIG. 5C an upper part of the trap doors 20, 10 21 strikes an upper rearwardly positioned bar 41, 42 respectively. At this point therefore further retracting motion of the arms 22, 23 results in pivoting movement of the trap doors 20, 21 with respect to the bars 41 and 42. Thus each of the trap doors 20, 21 pivots at its lower end in a clockwise and counter clockwise direction respectively. The bars 41, 42 are examples of rear upper detents.

In FIG. 5D each of the trapdoors 20, 21 strikes lower horizontal bars 43, 44 respectively located close to a bottom corner of the box 11, 12. In this fully open position the trap doors are inclined so that they are slightly tilted forwardly with their top edges closer to the central axis of the box 11, 12 than the lower edge. In this orientation the trap doors are completely away from beneath the openings 15, 16 in the trough 14 and material is able to pass through the openings without touching the trap doors 20, 21. Furthermore as the trap doors have their upper faces tilted downwardly, any material which may be located on them will fall off them under the action of gravity.

In addition to the above because the hydraulic rams are normally operated quickly between open and closed positions the trap doors effectively snap open and closed. Thus when the trap doors strike the relevant bars in an opening or closing action, the striking action is sufficiently hard to further dislodge any material which may have built up on the upper surface thereof.

In addition to the above because each of the trap doors are completely out of the path of falling material and are slightly tilted forwardly in their fully opened position, there is minimal tendency for any material to gather on the front faces of these trap doors.

It should be noted that by changing the position of the bars 37, 38, 41, 42, 43, 44 the final position of the trap doors can be changed in either the fully open or fully closed mode of operation.

It is noted that bar 41 and bar 43 are aligned so that bar 41 is slightly forward of bar 43. The same is true of bars 42 and 44. The bars 43, 44 are examples of lower detents.

Each of the hydraulic rams 24, 25 may be replaced by other types of mechanisms which are able to control opening and closing of the trap doors 20, 21. Ideally however they are centrally located between the upper and lower flange plates 27, 28. Furthermore the trough 14 is centrally located and the arrangement of trap doors, openings and horizontal bars is symmetrical about a central vertical axis through divider 17.

It is preferred that with the arrangement described above material which is fed into the trough of the first box is able to be released at controlled time intervals so as to fall into the trough of the second box and to collect in the second box to a level sufficient to ensure the integrity of any sample taken from the mixer/sampler chamber below when material is passed thereto. It is preferred that material collects in the second box until a predetermined quantity is reached (as determined by sensors or timing) and is then released into the mixing chamber below.

According to the preferred embodiment both trap doors open simultaneously such as when a data processor controls operation of the pneumatic rams/arms. By opening the trap door simultaneously material is able to fall through both openings at the same time and this ensures a uniform drop of material directly down to the box below where it collects on the closed doors of the second box. Without this operation there could be a greater build up of material on one side of the second box as opposed to the other.

According to one variation each of the trap doors may be provided with sensors to measure the weight of material which collects in the trough above. When a predetermined weight is reached material may be released as desired.

The preferred embodiment of the invention has been described having regard to two trap doors for two openings in a V-shaped trough. It should be noted however that the invention is equally applicable to a single trap door and single opening or to a trough having a different shape.

In addition to the above although the hydraulic rams have been described in an embodiment where the trap doors move horizontally to the side of the box, operation would also be possible if movement away from the openings occurred at an angle above or below the horizontal as long as this resulted in the trap doors being removed from the path of material falling through the opening(s).

It is to be understood that, if any prior art publication is referred to herein, such reference does not constitute an admission that the publication forms a part of the common general knowledge in the art, in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A closure system for a trough, comprising:
a first closure member and a second closure member, the first closure member being movable between a closed position, where it closes against the perimeter of a first opening in the bottom of a trough and an open position where it retracts to a position away from contact with the perimeter of the first opening, the second closure member being movable between a closed position where it closes against the perimeter of a second opening in an opposite side of the bottom of the trough and an open position where it retracts to a position away from contact with the perimeter of the second opening;

first and second controllers operable to move the first closure member and second closure member respectively between the open and closed positions; and a first front upper detent and a second front upper detent which respectively provide stops against which the upper edges of respective closure members abut in the closed position.

2. The closure system as claimed in claim 1 wherein the trough has a bottom section comprising a lower divider separating the first and second openings.

3. The closure system as claimed in claim 1, wherein the first and second closure members form a V-shaped bottom section of the trough when in the closed position.

4. The closure system as claimed in claim 3 wherein the first and second closure members when in the closed position are inclined symmetrically with respect to the divider.

5. The closure system as claimed in claim 1 wherein at least one closure member is retractable to the open position below the trough.

6. The closure system as claimed in claim 1 wherein at least one closure member is retractable to a position adjacent one side of the trough.

7. The closure system as claimed in claim 1 wherein at least one of the closure members is adapted to move laterally between the open and closed positions.

8. The closure system as claimed in claim 1 wherein at least one of the closure members is adapted to move horizontally between the open and closed positions.

9. The closure system as claimed in claim 8 wherein the closure members are adapted to move in opposite directions when moving from the open to the closed positions.

10. The closure system as claimed in claim 1 wherein the first closure member comprises a flat wall pivotally attached to an arm of the first controller.

11. The closure system as claimed in claim 10 wherein the second closure member comprises a flat wall pivotally attached to an arm of the second controller.

12. The closure system as claimed in claim 1 wherein each closure member is adapted to pivot upwardly with respect to the respective front upper detent, towards the closed position, when its upper edge strikes the front upper detent.

13. The closure system as claimed in claim 12 wherein the trough has a bottom section comprising a lower divider separating the first and second openings and the lower edge of each closure member is adapted to abut the divider when in the closed position.

14. The closure system as claimed in claim 1 including a first rear upper detent and a second rear upper detent which respectively provide stops against which upper edges of the closure members abut when moving to the open position.

15. The closure system as claimed in claim 14 wherein each closure member is adapted to pivot away from the trough with respect to the rear upper detent when retracting to the open position.

16. The closure system as claimed in claim 15 including first and second lower detents which are respectively adapted to provide stops against which the lower edges of the respective closure members abut in the open position.

17. The closure system as claimed in claim 16 wherein each lower detent is positioned laterally behind the respective rear upper detent.

18. The closure system as claimed in claim 1 wherein each controller comprises a hydraulic or pneumatic ram.

19. The closure system as claimed in claim 1 including a housing component adapted to be connected above a like housing or mixer apparatus.

20. The closure system as claimed in claim 19 wherein the housing component is adapted to be connected below a component for providing a vortex for forcing the material through the openings.

21. The closure system as claimed in claim 19 wherein the housing component includes a top flange and a bottom flange for connection to upper and lower components respectively.

22. The closure system as claimed in claim 1 wherein the closure members are controlled by the controllers to snap open or closed.

23. The closure system as claimed in claim 1 wherein the closure members are able to pivot with respect to arms of the respective first and second controllers 24. The closure system as claimed in claim 23 wherein the closure members comprise rectangular plates connected to distal ends of arms of the controllers respectively for pivotal movement with respect thereto.

25. The closure system as claimed in claim 24 wherein the detents determine the extent to which each closure member is able to pivot.

26. The closure system as claimed in claim 21 wherein the trough forms part of the housing of the system and is located in the centre of the upper flange.

27. The closure system as claimed in claim 26 wherein the upper flange is connected to a receptacle or hopper.

28. The closure system as claimed in claim 24 wherein each closure member is provided with a locating portion at each end thereof for locating the closure members against side walls of the trough in the closed position.

* * * * *